July 14, 1959 A. M. MOORE 2,895,016

MAGNETIC ERASING METHOD

Filed Nov. 22, 1954

INVENTOR.

Armistead M. Moore,

BY

Frank S. Troidl

ATTORNEY.

United States Patent Office 2,895,016
Patented July 14, 1959

2,895,016

MAGNETIC ERASING METHOD

Armistead M. Moore, Houston, Tex., assignor, by mesne assignments, to Jersey Production Research Company, Tulsa, Okla., a corporation of Delaware Application November 22, 1954, Serial No. 470,373
2 Claims. (Cl. 179—100.2)

This invention relates to magnetic recording. More particularly, this invention relates to an improved method for erasing a magnetic medium.

In magnetic recording a magnetizable medium is moved at a constant speed past a magnetic recording head which is capable of inducing in the medium a magnetization proportional to the current fed to the recording head. In this way the variation of the current with time is recorded on the magnetizable medium as a variation of magnetization. This varying magnetization produces a magnetic field around the medium and as the medium is brought near a reproducing head gives rise to a flux through the coil of the head proportional to the magnetization in the medium. During the playback the medium is moved past this reproducing head where the flux variations induce a voltage across the coil. In addition to the recording head and the reproducing head, a magnetic recording system generally includes as a component thereof an erasing head which obliterates anything which might have previously been recorded on the magnetic medium and prepares the magnetic medium for the registration of new magnetization on the medium by the recording head.

The most widely accepted method of erasing a magnetic medium is to apply a saturating alternating magnetic field which is applied to the moving magnetic medium by the application of an alternating current through the coils of the erasing head. A substantially constant frequency and substantially constant current is applied to the magnetic medium. However, this previously used method of erasing the magnetized magnetic medium has several disadvantages, particularly if the medium is moving past the erasing head at a fairly high speed, such as the revolving speed of a magnetic drum.

In order for the erasing head to efficiently erase the magnetic medium a minimum number of reversals of the alternating magnetic field applied to the magnetic medium as a result of the application of the alternating current through the coil in the erasing head must occur. The erasing frequency depends, among other things, on the velocity with which the magnetic medium is moving. If the velocity of the moving magnetic medium is increased, the erasing frequency must likewise be increased in order to effect the occurrence of the required minimum number of magnetic field reversals as the medium moves past the erasing head. It has been found that utilizing an erasing frequency of approximately 60 cycles, if the magnetic medium is moving at a rate of more than two inches per second, the erasure is faulty.

For certain recording operations efficiency is improved and time saved if a high speed magnetic medium is utilized. However, when it is attempted to apply the required high frequency alternating magnetic field by applying a high frequency alternating current to the coil of the erasing head, because of the skin effect, eddy currents, etc. heat losses become very large at this high frequency, the effect of these heat losses increasing with an increasing frequency if a constant current is utilized. Therefore, the power requirements on the associated equipment are great. In addition to the foregoing disadvantage, the consequent heating of the erasing head may destroy it and if the head is utilized with a magnetic medium revolving on a magnetic drum, heating will expand the erasing head which is normally slightly spaced from the magnetic drum causing the head to contact the drum coating thereby damaging the coating and the head. Hence it would be very desirable to devise a method which would effectively erase a magnetic medium which is going at a high rate of speed which would not require a high power source for proper operation and would not heat the erasing head to the point of possible damage to the head.

It is an object, therefore, of this invention to provide an improved method of erasing a magnetic medium.

Briefly described, my new method consists of the steps of applying a low frequency saturation alternating current to the erasing head and then continually increasing the frequency of the current while decreasing the magnitude of the current. By this method a low frequency is initially utilized and hence does not involve the requirement of a high power and the heat losses are negligible. Yet because the current is high enough to saturate the magnetic medium, magnetization on the magnetic medium, due to the original signal on the medium, is obliterated. However, the total amount of magnetization on the medium is increased due to the initially applied current. Due to partial self-demagnetization of the medium the magnetization decreases somewhat before the medium is exposed again to an erasing magnetic field. Therefore, even though the erasing field is decreasing in intensity, at each successive exposure of the medium, the intensity is sufficiently high to override the magnetization then present on the medium. The amount of heat dissipated from the erasing head, in addition to being a function of the frequency, is proportional to the square of the current. As the frequency is increased heating tends to increase but by utilizing my new method of continually decreasing the current any increase in total heat losses is prevented. The period required to continually change from a high current low frequency to a low current high frequency is about a second when the magnetic medium is moving past the erasing head with a linear velocity of approximately 312 inches per second.

Other objects and advantages will become apparent from the following description and drawings, in which.

Figure 1:
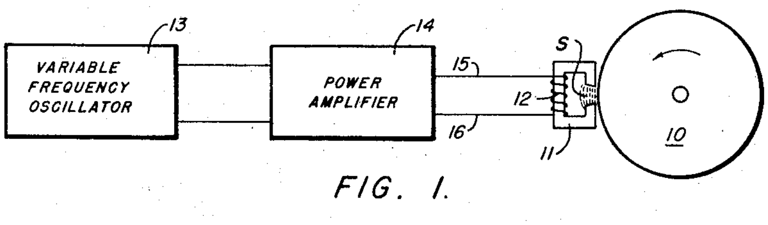
Fig. 1 is a block diagram showing an electrical system utilized in practicing my new method.

Referring more particularly to Fig. 1, numeral 10 refers to a high speed revolving magnetic drum. The magnetic drum 10 may revolve as much as 12 times in a second and have a circumferential speed of 312 inches per second. The magnetic drum 10 is coated with a magnetic powder in a binding medium which is sprayed onto the magnetic drum. A common form of magnetic powder utilized consists of $Fe_2O_3$ or $Fe_3O_4$.

Assuming the drum is originally magnetized and it is desired to obliterate the magnetization on the drum preparatory to recording a new signal on the drum, the drum is moved past an erasing head which consists of a highly permeable core structure 11 with a conducting coil 12 wound about the permeable core 11. Upon the application of a current to the coil 12 a magnetic flux is established across an air gap S in the erasing head. The previous practice has been to apply an alternating current having a constant amplitude and a constant frequency to the erasing head. Using a constant amplitude current as was the practice previous to the invention of my new method, the practical limit to the frequency which can be applied to the coil 12 is 100 kc. However, if the drum is revolving too fast as, for example, at a linear velocity of 312 inches per second the number of magnetic reversals obtained as the drum revolves past the erasing head is only one and a half. Any higher frequency applied constant current would result in the excessive heating of the erasing head which might destroy the head and the drum coating. To practice my new method, I include in the system a variable frequency oscillator 13 which feeds an alternating current to a power amplifier 14 and from thence through conducting leads 15 and 16 to the coil 12 of the erasing head. A current high enough to initially saturate the magnetic medium is first applied at a low frequency and then the frequency is continually increased and the current continually decreased over a period of about a second. In this period of time approximately 20 or more reversals of the alternating magnetic field which is erasing the magnetic medium is obtained. Also a final A.C. frequency of as high as 200 kc. can be utilized without requiring a high power supply and without overheating the erasing head. The frequency is cycled from about 50 kc. to 200 kc. in the period of a second. Because of the higher number of reversals obtained, as well as the slower total demagnetization of the medium, a better erasure of the magnetic drum is obtained in carrying out my new method than is obtainable utilizing previous methods of erasing.

Figures 2, 3, 4:
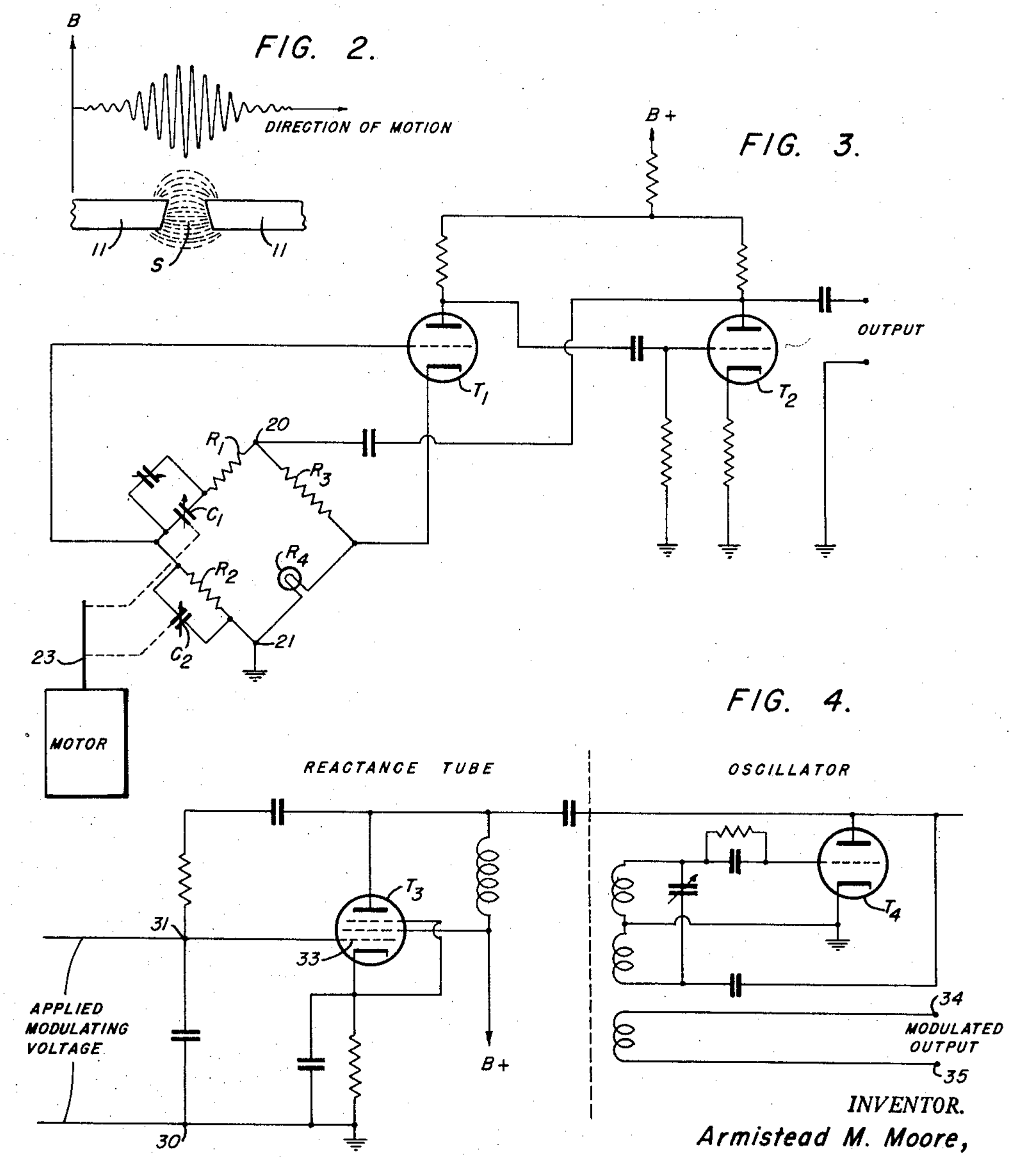
Fig. 2 is a graphical representation of the magnetic field reversals effected in a moving magnetic medium as it passes an erasing head.
Fig. 3 is an electrical circuit diagram of one type of oscillator which may be utilized in my new method.
Fig. 4 is an electrical circuit diagram of a second type of oscillator which may be utilized in carrying out my new method.

In Fig. 2 I show a graphical representation of the high frequency field which causes the erasure of the magnetization on the magnetic medium. Upon the application of the alternating current a magnetic flux is developed across the gap S of the permeable medium 11 in the erasing head. The effective gap of the erasing head is slightly more than the actual gap as shown by the flux lines which begin and end at points on the permeable member 11 other than their extremities. The high frequency magnetic field magnetizes the magnetic medium in both directions of polarization up to saturation. When the magnetic medium, however, has retreated from the erasure head the field becomes proportionately smaller as the leakage flux gets weaker. The number of cycles or reversals to which the moving magnetic medium is subjected as it traverses the air gap S determines the amount of erasure, the greater the number of cycles the better the erasure. Fig. 2 therefore illustrates clearly the dependence of the amount of erasure on the speed of the moving medium and the frequency of the applied magnetic field.

Figs. 3 and 4 are circuit diagrams of two embodiments of variable frequency oscillators which may be utilized in practicing my new method. Fig. 3 shows a motor driven Wien bridge oscillator, the frequency of the oscillator being dependent upon the capacitance of capacitors $C_1$ and $C_2$. Included in the circuit of the oscillator is a triode $T_1$ and a second triode $T_2$ for amplifying the voltage and for phase shifting for sustaining oscillations. Also included in the electrical circuit is a resistance $R_3$ which is connected in series with a resistance $R_4$ which consists of an incandescent lamp. Resistances $R_3$ and $R_4$ are connected across junctures 20 and 21. Also connected across junctures 20 and 21 is a resistance $R_1$, a capacitor $C_1$ and a resistance $R_2$ and capacitor $C_2$. Capacitors $C_1$ and $C_2$ are varied by a slow speed 60 r.p.m. A.C. motor. The air condensors $C_1$ and $C_2$ have a common shaft 23 attached directly to the A.C. motor. The lamp $R_4$ is a tungsten filament lamp which possesses a positive temperature coefficient of resistance. The hotter the filament of the lamp the higher is the resistance. Therefore, if the amplitude of the oscillators tends to increase the lamp becomes hotter and $R_4$ increases. As a result the grid cathode potential of triode $T_1$ is reduced with a resulting decrease of amplitude. If $R_3$ is properly adjusted initially the amplitude of the oscillators is maintained at a substantially constant level even though the frequency may be varied over very wide limits.

Fig. 4 shows a frequency modulated oscillator using a reactance tube modulator. This circuit includes a pentode $T_3$ and a triode $T_4$. Here the tank circuit is an ordinary oscillator such as a Hartley oscillator, which is shunted by the plate cathode circuit of a pentode called a reactance tube which draws a reactive current that varies with the applied modulating voltage which is applied across terminals 30 and 31. The reactive current has an effect equivalent to associating a capacitive reactance with the oscillator tank circuit and so affects the generated frequency. Frequency modulation is obtained by applying the modulating voltage to the grid 33 of the reactance tube $T_3$. This varies the transconductance of the reactance tube in accordance with the modulating voltage and so varies the reactance effect and hence the frequency which is obtained across the output terminals 34 and 35.

In operation, a high current low frequency, alternating current is applied to the coil 12 of the erasing head. The frequency of the variable frequency oscillator is increased gradually over a period of approximately a second. This increased frequency which is passed across the coil 12, which serves as an induction coil, results in a decreasing current in the coil due to increased impedance. During the one second cycling from 50 kc. to 200 kc. the revolving drum which may revolve at a speed as 312 inches per second will pass by the air gas S of erasing head 11 approximately 12 times. At each successive time that the magnetic medium passes through the air gap S there will be less residual magnetism remaining on the drum thereby requiring the application of less current at the next successive pass through. This, in effect, amounts to a continual reduction of the hysteresis loop. The number of magnetic reversals obtainable by my new method is more than 20 thus effecting a better erasure as compared with previous obtainable reversals of not more than 18.

It can be seen that my new method provides for a better erasure over previous erasing methods, does not require the amount of power which is necessary in carrying out the previous methods, and can be utilized very effectively on a high speed moving magnetic medium without causing the expansion of the magnetic erasing head thereby eliminating possible damage to the head and the coating on the magnetic drum.

I claim:

1. A method of demagnetizing a high-speed rotating magnetic drum using at least one erasing head including the steps of: applying to the erasing head an alternating current of a magnitude sufficient to saturate the original magnetization on said rotating magnetic drum to decrease the magnetization on the drum as a magnetized portion of said drum passes under the erasing head; and continually decreasing the magnitude of said alternating current while increasing the frequency of said alternating current as said magnetized portion of said drum passes under the erasing head until the magnetization is completely erased.

2. A method in accordance with claim 1 wherein the frequency ranges from approximately 50 kilocycles per second to approximately 200 kilocycles per second.

References Cited in the file of this patent

UNITED STATES PATENTS

| | | |
|---|---|---|
| 2,118,174 | Doane | May 24, 1938 |
| 2,251,300 | Star | Aug. 5, 1941 |

FOREIGN PATENTS

| | | |
|---|---|---|
| 691,711 | France | July 21, 1930 |

OTHER REFERENCES

Scientific Papers of the Bureau of Standards, No. 78, Sept. 3, 1907, pages 213 and 236–242.